Sept. 26, 1967  A. MÜNZER ETAL  3,343,801
DEVICE FOR MOLDING SYNTHETIC FITTINGS
Filed Oct. 20, 1964  4 Sheets-Sheet 1

INVENTORS
Anton Münzer
Theodor Röger

BY

United States Patent Office 3,343,801
Patented Sept. 26, 1967

3,343,801
DEVICE FOR MOLDING SYNTHETIC FITTINGS
Anton Münzer and Theodor Rüeger, Schaffhausen, Switzerland, assignors to Georg Fischer Aktiengesellschaft, Schaffhausen, Switzerland
Filed Oct. 20, 1964, Ser. No. 405,048
Claims priority, application Switzerland, Oct. 21, 1963, 12,883/63
2 Claims. (Cl. 249—145)

The present invention relates to a device for making synthetic fittings, and, more particularly, synthetic fittings having a lateral connection. The lateral connection of tubular members of synthetic material frequently form therewith an angle of approximately 90°. The inlet edge of such connection—edge of the penetration—has to be well rounded in order to avoid backup and throttling effects. When producing T-members of sheet metal, this can be effected by flanging. When producing such T-members of synthetic material, it has heretofore been necessary manually to insert a particularly profiled core for the above mentioned section. If it were not for the rounded edge above referred to, the individual cores could easily be introduced into and withdrawn from the tubular main section in the direction of said connection. However, when the rounded edge is required, it has been necessary heretofore in each instance manually to insert a separate eccentric core. In view of this operation, it has been impossible heretofore fully to automate this operation, and additional operating personnel was heretofore required in this connection.

It is, therefore, an object of the present invention to provide a device for making fittings such as T, L, cross members, and the like of synthetic material, which will overcome the above-mentioned drawbacks.

It is another object of this invention to provide a device as set forth in the preceding paragraph which will permit the automation of synthetic fittings such as T-members, L-members, cross members, and the like.

These and other objects and advantages of the invention will appear more clearly from the following specification in connection with the accompanying drawings, in which:

FIG. 1 illustrates an injection mold and a work piece in section with introduced cores in view.

FIG. 2 shows the same mold as illustrated in FIG. 1 but with the cores withdrawn, the intermediate core being shown in section.

FIG. 3 illustrates the intermediate core partly sectioned while actuating means therefor have been omitted.

FIG. 4 is a section along the line IV—IV of FIG. 3.

FIG. 5 is a top view of an insert part of the intermediate core.

FIG. 6 is an elevational view of the member of FIG. 5.

FIG. 7 is an elevational view partly in section of the insert member of FIG. 5.

The device according to the present invention, which is particularly suitable but by no means limited to the manufacture of synthetic fittings with inlet connection, and which comprises at least two mold plates and at least two core studs, is characterized primarily in that a trapezoidal insert with an outwardly directed concave curved surface is pivotally journalled in the front portion of a core.

Figure 1:
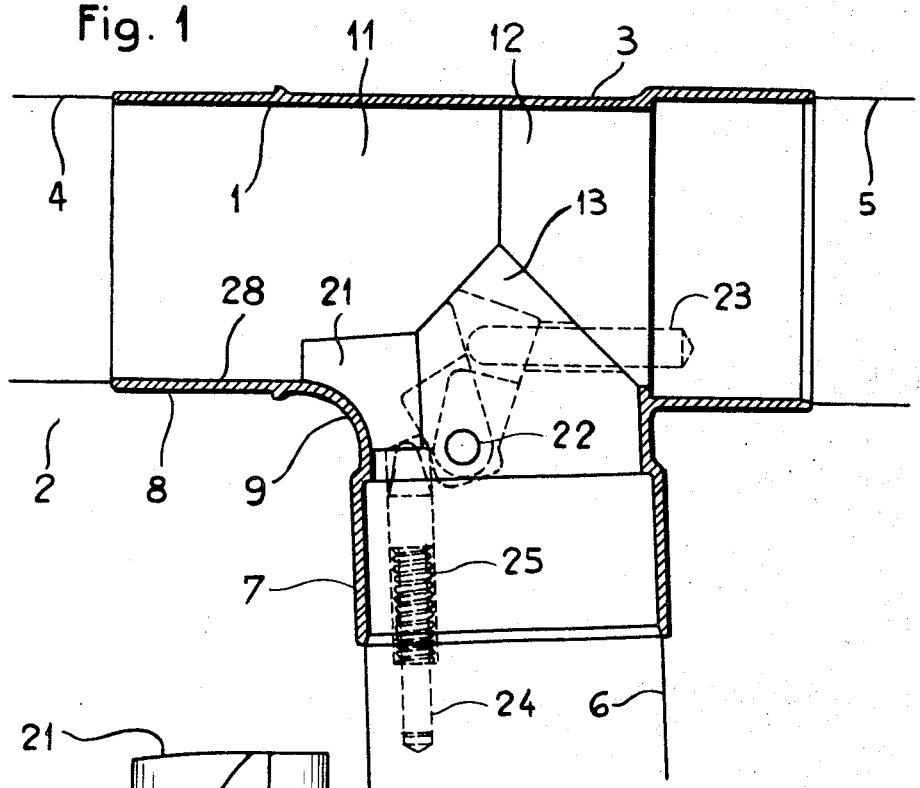
FIGS. 1 to 7 illustrate an embodiment of a device according to the present invention in different positions, and, more specifically.
Figure 8:
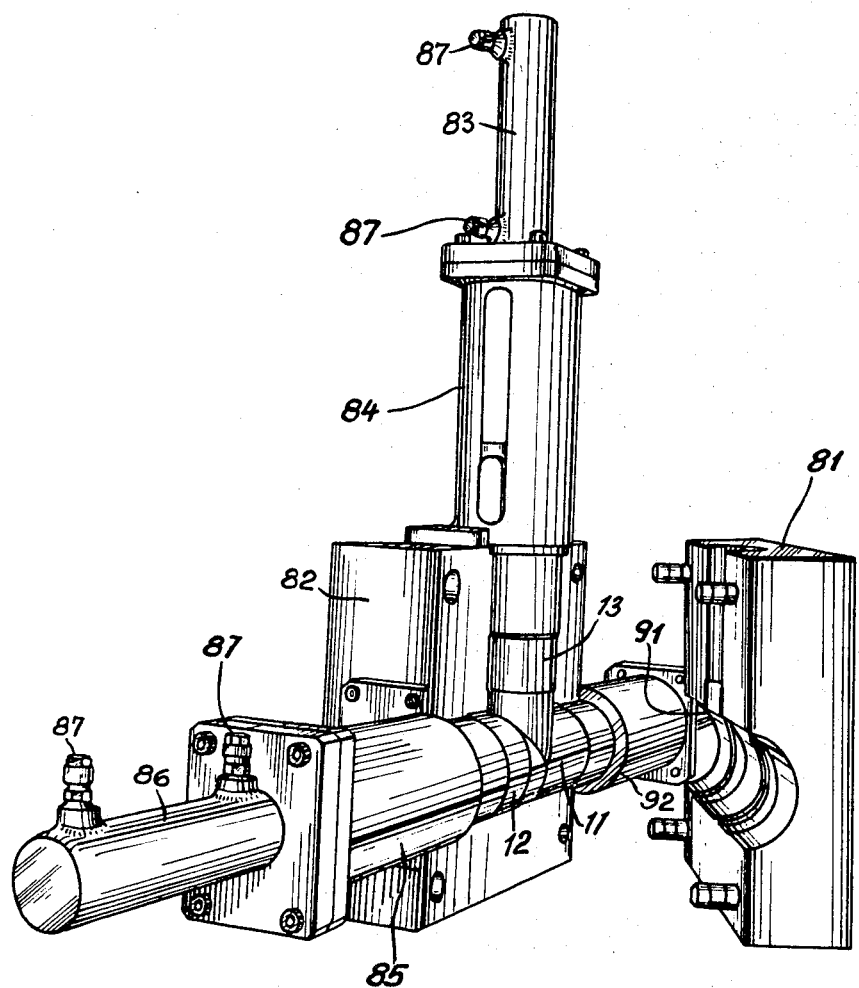
FIG. 8 is a perspective representation of an injection mold in opened condition, however with the core portions of FIG. 1 in molding position.

More specifically, referring to the drawings, the fitting or T-member 1 illustrated therein is manufactured in an injection mold 2 which has at least two mold plates separated from each other according to FIG. 1 by a parting plane coinciding with the drawing plane of FIG. 1. In FIG. 8 the two mold plates are identified at 81 and 82. The entire mold confines a chamber which has the outer contour 3 of the T-member 1 and the outer contour of the core supporting surfaces 4, 5 and 6. Fitting 1 is so designed that the merging portion from inlet connection 7 to the tubular section 8 (Fallstrang) is effected at as large a radius 9 as possible. This portion of the core cannot be covered by the stud-shaped cores 11, 12 and 13 by simple closure surfaces. Therefore, it has been necessary heretofore manually to insert a special insert core for this particular portion prior to closing the injection mold.

According to the present invention, at this portion there is provided an insert member 21 which is adapted to be pivoted out of and into core 13 and is pivotally connected thereto by pivot means 22. This insert member 21 is actuated by means of control pins 23 and 24 for instance through the intervention of spring means 25. If desired, it is, of course, also possible to actuate the control pins 23 and 24 by other means such as hydraulic means.

Figure 5:
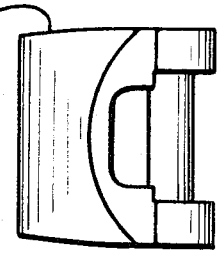
Figure 6:
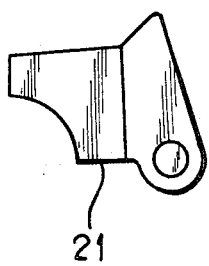
Figure 7:
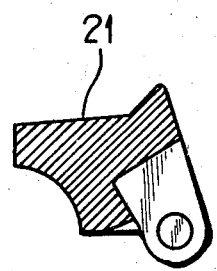
Figure 2:
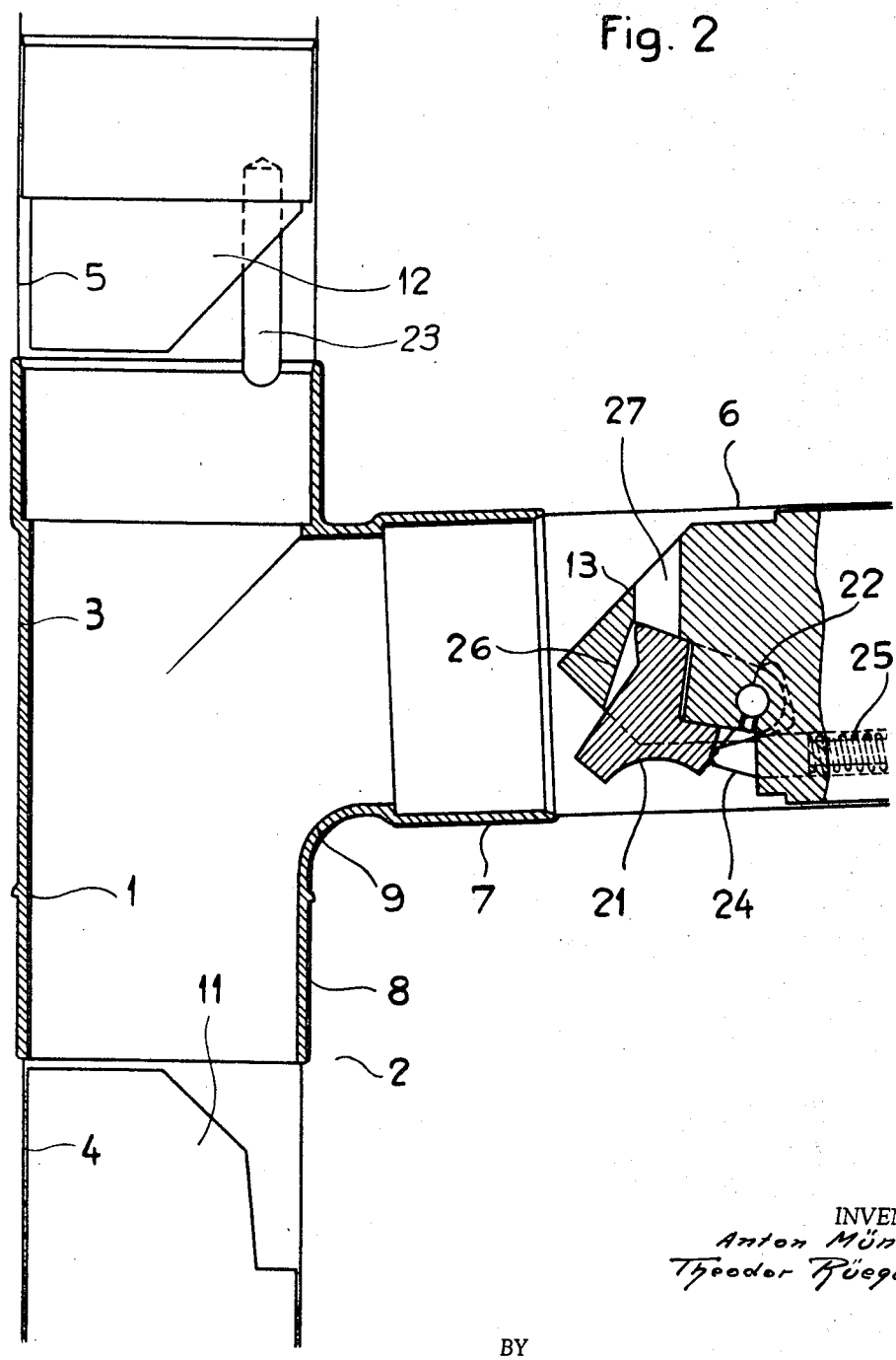
Figure 3:
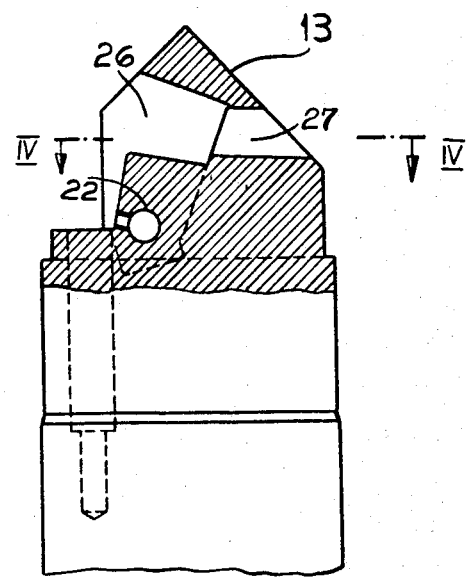
Figure 4:
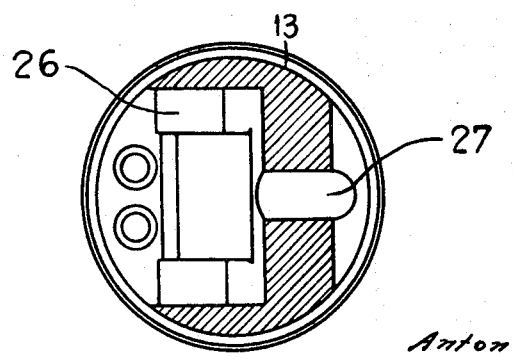

FIG. 2 shows the injection mold in opened position prior to the ejection of the molded article. The insert member 21 is, by means of spring 25, pressed by pin 24 into its rest position as shown in FIG. 2 so that when inserting core 13, no part will protrude beyond the contour of the T-member 1. To this end, core 13 is provided with a recess 26 and a bore 27 for the actuating pin 23. Core 13 is shown in detail and partly sectioned more clearly in FIGS. 3 and 4, while FIGS. 5, 6 and 7 show the insert member 21 in top view and elevation while according to FIG. 7 the central portion is sectioned.

As will be seen from FIG. 8, the injection mold formed by the mold plates 81 and 82 comprises guide sleeves 84, 85 and 92 carrying core portions 13, 12 and 11, respectively. Guide sleeves 84, 85, and 92 are screwed to the respective side walls of mold plate 82. The outer ends of the core portions 11, 12 and 13 which are slidably received in the guide sleeves are mechanically interconnected with the pistons (not shown) of hydraulic piston and cylinder units 83, 86 and 91. Each unit is provided with two pipe sockets 87 permitting to connect the interior of the cylinder at both sides of the piston with a hydraulic pressure source by way of solenoid valves not shown. These valves are controlled by means of an electrical circuit comprising a control device and limit switches the latter interrupting the flow of liquid to and from the cylinders when the cores have reached the positions in the mold shown in FIG. 8. The control device ensures a predetermined sequence of actuation of the pistons, i.e., movement of the respective cores into and out of the mold.

*Operation*

The operation of the device according to the present invention will best be understood in connection with FIGS. 1 and 2. As starting position is considered the withdrawn position of the cores illustrated in FIG. 2. After the molded article has been ejected from the open mold, core 13 moves into approximately the center of the mold as far as the fitting to be made thereby is concerned. Thereupon, core 12 is moved in while pin 23 moves insert member 21 into its active position shown in FIG. 1. The next step consists in moving core 11 inwardly from the left (with regard to the drawing). The three cores 11, 12 and 13 together with the insert member 21 define a closed outer contour 28 which in the mold will define the inner contour of fitting 1. Mold 1 may now be closed and an injection cycle may be initiated.

The opening of the mold is, of course, effected in inverse manner. First core 11 has to be withdrawn. Subsequently, core 12 is withdrawn, and insert member 21 is, by the thrust of spring 25, pivoted backwardly, .i.e, partly into core 13 so that core 13 may be withdrawn and the molded article may be ejected.

As will be evident from the above, the device according to the present invention makes it possible for the first time to automate the injection molding of an article of a relatively complicated shape, whereas, heretofore, the molding of such articles required the manual insertion of cores.

It is, of course, to be understood that the present invention is, by no means, limited to the molding of T-shaped members, L-shaped members and cross members but is also applicable for the shaping of other articles of synthetic material. It is also to be understood that the device according to the present invention is not limited to any specific synthetic material but can be applied in connection with any synthetic moldable material.

What we claim is:

1. An apparatus for making hollow fittings such as T-fittings with two sections arranged at an angle with regard to each other and communicating with each other while merging with each other at one side of one of said sections along a concave portion when looking from the outside of the fitting, which includes: at least two mold sections adapted to be composed to a mold having a cavity therein defining the external shape of said fitting and having openings at the surface of the mold to receive cores, said cores abutting when inserted in said openings and defining the internal shape of said fitting, and a plurality of cores insertable into said openings in said mold, one of said cores being provided with a recess on its inner end, said one core having a member pivoted thereto in said recess and having a curved region thereon corresponding to said concave portion on the inside of said fitting, said member being pivotal on said one core member from a retracted position on said one core member wherein it is disposed within the lateral limits of said one core member to an outward position thereon in which said member extends laterally from said one core member and defines the inner surface of said fitting inside the said concave portion therein, and actuating means for moving said member on said one core between the two said positions, said actuating means including spring means acting between said one core and said member and continuously urging said member toward its retracted position on said one core, and also including means on a second core operable upon insertion of said second core into its respective said opening following the insertion of said one core into its respective said opening to engage said member and move it to its extended position on said one core.

2. An apparatus according to claim 1, in which said first actuating means includes a slidable pin carried by said one core and pressed by said spring means against said member, and said second actuating means includes a plunger carried by said second core and projecting from the inner end thereof so as to engage said member and move it to its extended position against the bias of said spring pressed plunger.

References Cited
UNITED STATES PATENTS

| | | | |
|---|---|---|---|
| 3,092,441 | 6/1963 | Bilderbeek | 25—128 |
| 3,095,613 | 7/1963 | Christensen et al. | 25—128 X |
| 3,165,788 | 1/1965 | Davidson | 249—145 |
| 3,214,505 | 10/1965 | Pierkowski et al. | 18—45 X |

J. SPENCER OVERHOLSER, *Primary Examiner.*

E. MAR, *Assistant Examiner.*